(12) United States Patent
Ricketts (10) Patent No.: US 11,746,836 B2
(45) Date of Patent: Sep. 5, 2023

(54) LUBRICATION MECHANISM OF CLUTCH FOR AGRICULTURAL HARVESTER

(71) Applicant: CNH Industrial America LLC, New Holland, PA (US)

(72) Inventor: Jonathan E. Ricketts, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 77 days.

(21) Appl. No.: 17/410,100

(22) Filed: Aug. 24, 2021

(65) Prior Publication Data
US 2023/0064380 A1  Mar. 2, 2023

(51) Int. Cl.
*F16D 43/21*  (2006.01)

(52) U.S. Cl.
CPC .......... *F16D 43/21* (2013.01); *F16D 2300/06* (2013.01)

(58) Field of Classification Search
CPC .... F16D 43/21; F16D 43/211; F16D 2300/06; F16D 2300/0214
See application file for complete search history.

(56) References Cited

U.S. PATENT DOCUMENTS

| 4,653,623 | A | 3/1987 | Demorest |
| 7,937,918 | B1 | 5/2011 | Mossman |
| 2017/0089402 | A1* | 3/2017 | Deakin ................... F16D 25/14 |
| 2020/0271170 | A1 | 8/2020 | Tacke et al. |

FOREIGN PATENT DOCUMENTS

| CN | 208474353 U | 2/2019 |
| CN | 110686019 A | 1/2020 |
| DE | 10 2018 111 696 A1 | 11/2019 |
| JP | 2009-299832 A | 12/2009 |

* cited by examiner

*Primary Examiner* — Huan Le
(74) *Attorney, Agent, or Firm* — Peter Zacharias (57) ABSTRACT

A header assembly of an agricultural harvester, includes: a rotatable shaft; a torque limiter assembly coupled with the rotatable shaft, the torque limiter assembly including: a driving element coupled with the rotatable shaft; a driven element coupled with the driving element which is configured for selectively transmitting a torque to the driven element; an input seal element including at least one aperture; and an automatic lubrication mechanism coupled with the driven element, the automatic lubrication mechanism including a movable piston, the movable piston and the input seal element together at least partially forming a chamber therebetween configured for releasably containing a lubricant, the movable piston configured for forcing the lubricant out of the chamber through the at least one aperture so as to lubricate the driving element and the driven element.

15 Claims, 7 Drawing Sheets

LUBRICATION MECHANISM OF CLUTCH FOR AGRICULTURAL HARVESTER

FIELD OF THE INVENTION

The present invention pertains to an agricultural harvester, and, more specifically, to a lubricating mechanism of a clutch of the agricultural harvester.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Drive power is transmitted throughout the combine in order to drive various components, such as reels, augers on headers, as well as gathering chains and chopper blades of corn headers, feeders, clean grain elevators, unloading augers, and more. Clutches are dispersed throughout the combine to limit the amount of torque transmitted from driving elements to driven elements. One such clutch is a radial pin slip clutch. Further, several such radial pin slip clutches can be on a corn header alone, depending upon, for example, the number of row units and chopper units; other radial pin slip clutches can be associated with, for example, a feeder, or a clean grain elevator. Each such clutch of which can require interval greasing—more specifically, greasing multiple times—during a harvesting season. As running time passes, the grease may work itself out of the clutch, and contamination from material finding its way into the clutch may occur. If these clutches are not properly greased, the clutch torque can increase, resulting in the clutch becoming locked and failing to provide protection to downstream components, causing major repairs to such components as well as long downtimes. To add to these difficulties, such clutches on combines can be in locations that are difficult to access.

A greasing system of a wheel bearing is known. This greasing system provides a cavity for holding grease, which can be pushed into pertinent parts of the wheel bearing by a spring-loaded piston.

What is needed in the art is a way to extend the amount of time between occasions when a clutch needs lubrication with grease.

SUMMARY OF THE INVENTION

The present invention provides a clutch with an automatic lubrication mechanism, resulting in an increased amount of time between occasions when the clutch needs lubrication with grease.

The invention in one form is directed to a torque limiter assembly of an agricultural harvester, including: a driving element configured for being coupled with a rotatable shaft of the agricultural harvester; a driven element coupled with the driving element which is configured for selectively transmitting a torque to the driven element; an input seal element including at least one aperture; and an automatic lubrication mechanism coupled with the driven element, the automatic lubrication mechanism including a movable piston, the movable piston and the input seal element together at least partially forming a chamber therebetween configured for releasably containing a lubricant, the movable piston configured for forcing the lubricant out of the chamber through the at least one aperture so as to lubricate the driving element and the driven element. The torque limiter assembly can be a radial pin slip clutch.

The invention in another form is directed to a header assembly of an agricultural harvester, including: a rotatable shaft; a torque limiter assembly coupled with the rotatable shaft, the torque limiter assembly including: a driving element coupled with the rotatable shaft; a driven element coupled with the driving element which is configured for selectively transmitting a torque to the driven element; an input seal element including at least one aperture; and an automatic lubrication mechanism coupled with the driven element, the automatic lubrication mechanism including a movable piston, the movable piston and the input seal element together at least partially forming a chamber therebetween configured for releasably containing a lubricant, the movable piston configured for forcing the lubricant out of the chamber through the at least one aperture so as to lubricate the driving element and the driven element. The torque limiter assembly can be a radial pin slip clutch.

The invention in yet another form is directed to a method of using a torque limiter assembly of an agricultural harvester including a header assembly, the method including the steps of: providing a rotatable shaft and a torque limiter assembly coupled with the rotatable shaft, the torque limiter assembly including a driving element, a driven element, an input seal element, and an automatic lubrication mechanism, the driving element being coupled with to the rotatable shaft, the driven element being coupled with the driving element, the automatic lubrication mechanism being coupled with the driven element and including a movable piston; transmitting selectively, by the driving element, a torque to the driven element; containing releasably a lubricant by a chamber formed at least partially by the movable piston and the input seal element together therebetween; and forcing, by the movable piston, the lubricant out of the chamber through at least one aperture of the input seal element so as to lubricate the driving element and the driven element. The torque limiter assembly can be a radial pin slip clutch.

An advantage of the present invention is that it provides a way to extend the amount of time between occasions when the clutch needs lubrication with grease.

Another advantage of the present invention is that it increases the amount of time between greasings of the clutch such that the clutch may need to be greased once, or possibly twice, during a harvesting season with the combine.

Yet another advantage of the present invention is that it reduces the number of times during a harvesting season when the operator has to access numerous difficult-to-access places on the combine to grease each pertinent clutch.

Yet another advantage of the present invention is that it provides an elegantly simple solution to the clutch greasing problem.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
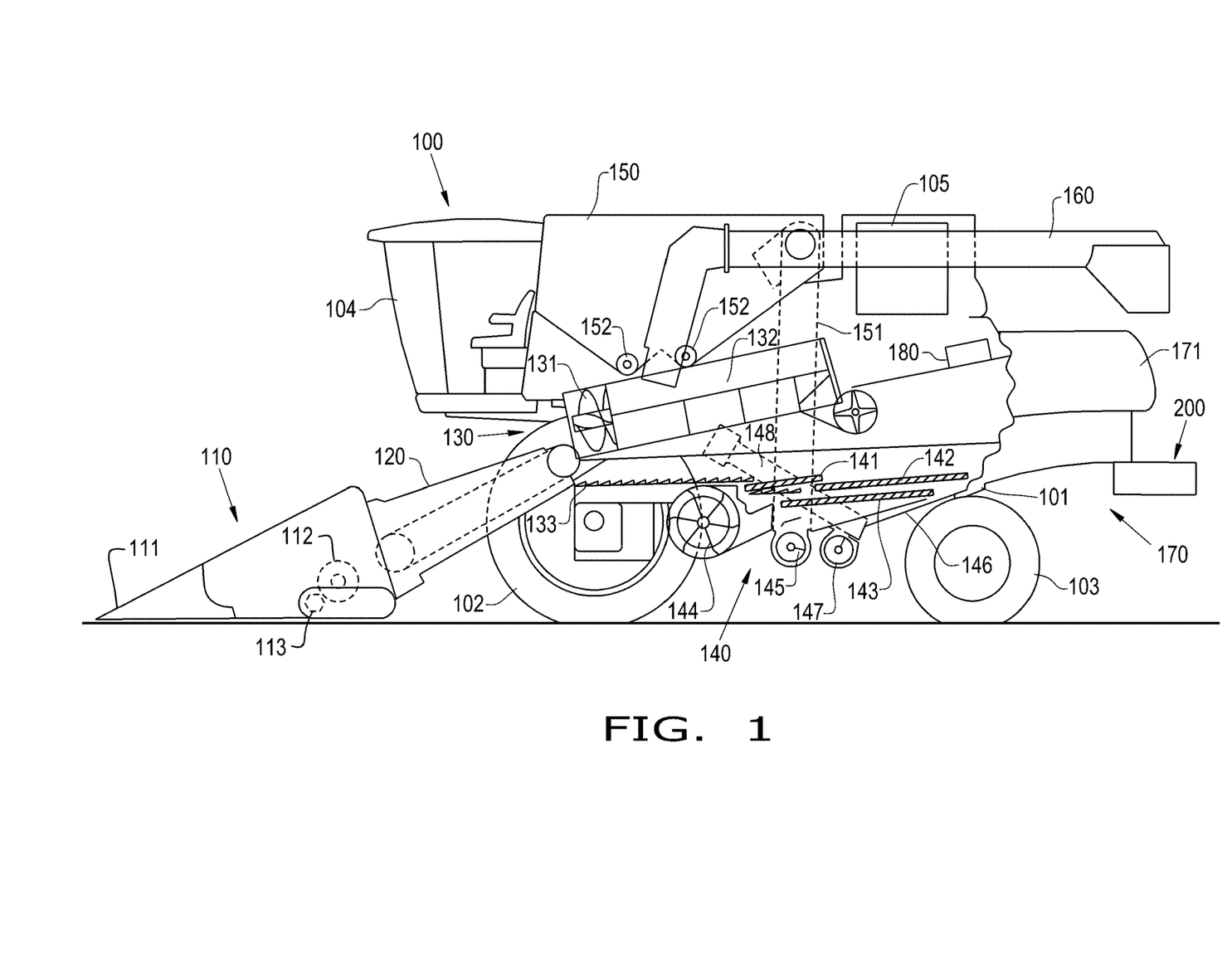
FIG. 1 illustrates a side view of an exemplary embodiment of an agricultural vehicle, the agricultural vehicle comprising a header assembly, in accordance with an exemplary embodiment of the present invention.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and, in this example, is a corn header 110 (which can also be referred to as a corn head or a corn assembly). Header 110 includes a plurality of snouts 111 spaced apart across the front of header 110 (the left-most snout shown in FIG. 1) and a plurality of row units (not shown) each positioned between two respective snouts 111, the row units separating the ear of corn from respective stalks in a field during forward motion of combine 100 and moving the ear to an auger 112, such as a double auger 112, which feeds the severed crop (here, a ear of corn) laterally inwardly from each side toward feeder housing 120. A rotatable shaft 113 is disposed transversely within header 110, is coupled with a header gearing (not shown)(the header gearing being driven by a power distribution system of combine 100), receives drive power from the header gearing, and thereby drives downstream components, one such downstream component being chopper system 214 (FIG. 2) of header 110 to which shaft 113 is coupled. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180, which may include knives, may also be what is typically referred to as a "beater", which may include flails, or other construction and that the term "chopper" with reference to chopper 180 refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
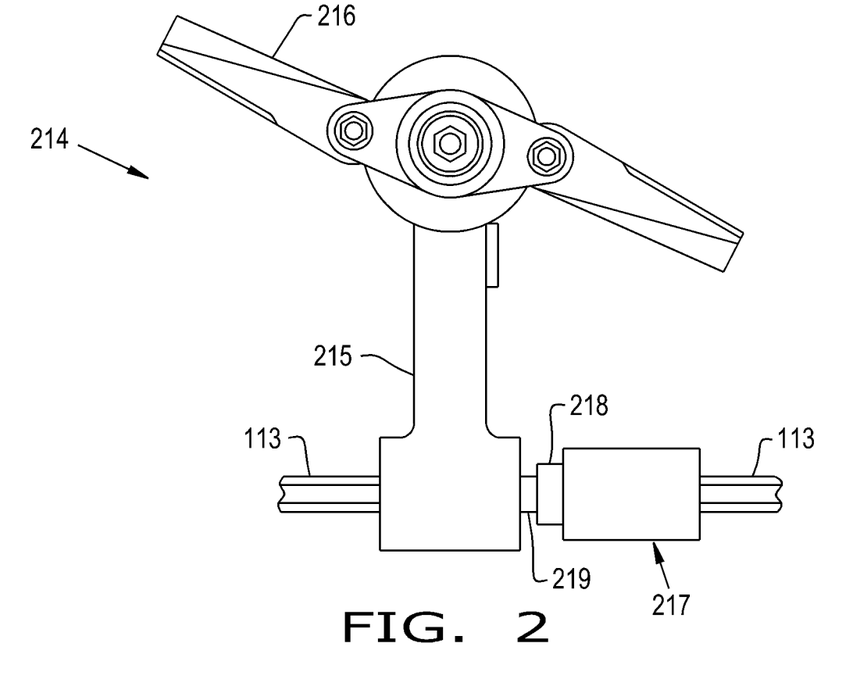
FIG. 2 illustrates a bottom view of a chopper blade system of the header assembly of FIG. 1, in accordance with an exemplary embodiment of the present invention.

Referring now to FIG. 2, there is shown chopper blade system 214 coupled with shaft 113, which can have a hexagonal cross-section (chopper blade system 214 is distinct from chopper 180). Chopper blade system 214 is disposed below a respective row unit of header 110 and serves to chop a respective stalk of corn at a predetermined height from the ground, thereby contributing positively to disposing of residue that will facilitate subsequent planting in the field. Chopper blade system 214 includes a gearcase 215, at least one chopper blade 216 (two such chopper blades 216 being shown in FIG. 2), and a torque limiter assembly 217. Gearcase 215 houses therein gearing (not shown), which includes the gearing for transmitting torque from shaft 113 (by way of torque limiter assembly 217) to chopper blades 216. Chopper blades 216 rotate so as to cut cornstalks as header progresses forward over the ground, thereby leaving a stub of stalk at a predetermined height in the ground. Torque limiter assembly 217 can be configured as a slip clutch, such as a radial pin slip clutch, in accordance with an exemplary embodiment of the present invention. Torque limiter assembly 217 (which can be referred to as a clutch, or a slip clutch, or a radial pin slip clutch) thus serves to selectively transmit or limit torque from shaft 113 to the gearing in gearcase 215. A rotatable input shaft 219 runs into gearcase 115 and provides torque to the gear, which in turn rotates chopper blades 216 by way of an output shaft extending from gearcase 215. The input shaft for the gearing in gearcase 115 can be a male shaft that is inserted into a female output shaft 218 of clutch 217, the input shaft including large splines on an outer surface thereof which mate with large grooves on an inner surface of female output shaft 218 of clutch 217 such that output shaft 218 of clutch 217 supplies drive power to input shaft 219 for the gearing in gearcase 115. Output shaft 218 of clutch 217 and input shaft 219 extend parallel to and are concentric with shaft 113, which extends through and is contactless (at least directly) relative to output shaft 218 of clutch 217 (FIG. 2 shows output shaft 218 clamped to input shaft 219 by way of heavy-duty bolts. Moreover, shaft 113 also extends through gearcase 115 without transmitting drive power to the gearing of gearcase 115, except by way of clutch 217. FIG. 2 shows shaft 113 on the right side (input side) of clutch 217 and on the left side of gearcase 115.

While clutch 217 is shown protecting the gearing and chopper blades 216, as well as any other downstream components, of a chopper blade system, it will be appreciated that the clutch of the present invention can be used to protect any number of different types of components. For example, the clutch, in accordance with the present invention, can be used to protect row units, including or in addition thereto, gathering chains, and stalk rolls and their associated components such as gearing. Further, such clutches can be associated with driven components of a feeder housing (such as feeder housing 120) and a grain elevator (such as grain elevator 151) on a combine (such as combine 100). Such clutches can be radial pin slip clutches which are similar to clutch 217. Further, though the drive shafts of these clutches are not shown, it will be readily appreciated that such clutches require a drive shaft to driven the driving element, which in turn drives the driven element, which in turn drives the respective load. As such all such clutches on the combine are intended to be within the scope of the present invention.

Figure 3:
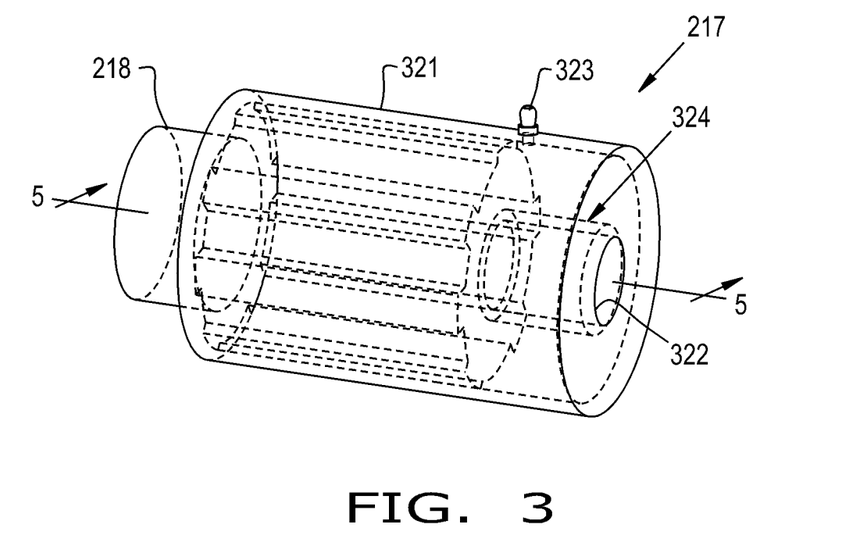
FIG. 3 illustrates a perspective view of an exemplary embodiment of a torque limiter assembly of the chopper blade system of FIG. 2, in accordance with an exemplary embodiment of the present invention.

Referring now to FIG. 3, there is shown portions of torque limiter assembly 217, disconnected from shaft 113. Torque limiter assembly 217, which couples with rotatable shaft 113, includes a driving element 420 (FIG. 4) mounted to (or otherwise coupled with) shaft 113 and a driven element 321 coupled with driving element 420 which is configured for selectively transmitting a torque to driven element 321. Driving element 420 is radially inward of driven element 321, such that driven element 321 is substantially concentric relative to driving element 420, and both driving element 420 and driven element 321 are concentric relative to shaft 113, which extends all the way through clutch 217 from one axial end to the other axial end of clutch 217 (as indicated in FIG. 2). Driving element 420 includes a bore 429 (FIG. 4) therethrough that includes a cross-section that is hexagonally shaped, so as to receive hexagonally-shaped shaft 113 therethrough, the mating shapes of driving element 420 and shaft 113 enabling shaft 113 to transmit drive power to driving element 420. In this way, driving element 420 is mounted directly to shaft 113, and driven element 321 is mounted to driving element 420. Driven element 321 is formed integral with (but, optionally, can be otherwise connected, by way of fasteners or the like, to) output shaft 218. Driven element 321 can be provided with at least one mechanism 323 for inserting a lubricant, such as grease, into the interior of clutch 217; such a mechanism 323 can be referred to as a grease fitting or a grease Zerk, which can be threaded and thus screwed into driving element (threads not shown). Clutch 217, in accordance with an exemplary embodiment of the present invention, is also provided with an automatic lubrication mechanism 324, which as in FIG. 3 can be formed integral, at least partially, with driven element 321. Automatic lubrication mechanism 324 (which can be referred to herein as automatic greater) includes a bore 322 which receives shaft 113 with clearance (that is, shaft 113 does not mate with and drive this bore 322).

Figure 4:
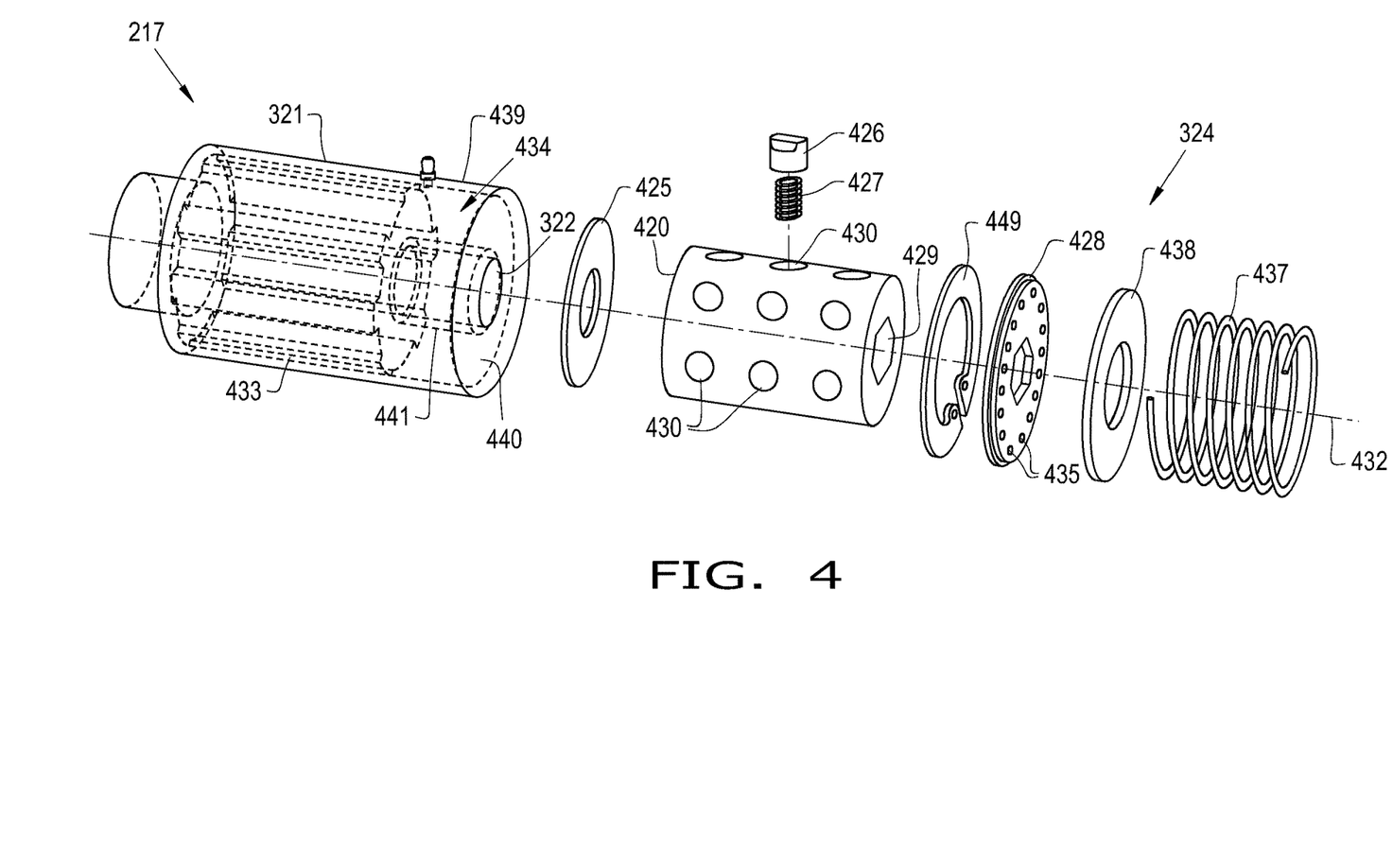
FIG. 4 illustrates an exploded view of the torque limiter assembly of FIG. 3.

Referring now to FIG. 4, there is shown an exploded view of clutch 217. As can be seen, clutch 217 includes not only driving element 420 and driven element 321, but also an output-side seal 425, pins 426, springs 427 for pins 426, a snap ring 449, an input-side seal 428, and automatic greater 324. Output-side seal 425, positioned axially between driving element 420 and driven element 321, seals in grease so that it does not escape clutch 217 and also prevents contaminants from entering into the interior of clutch 217. Though it is anticipated that some grease will escape clutch 217 over time and that some contaminants may occasionally enter clutch 217, the reinsertion of grease into grease Zerk 323 at intervals will refill clutch 217 with grease and push out any contaminants (from whatever source). Output-side seal 425 can be made of any suitable material, such as a polymer. Output-side seal 425 is shown in FIG. 4 as having an inner diameter that is circular, which can be sized to be larger than the largest radius of shaft 113 or to be about the same size as the largest radius of shaft 113 (as in FIG. 5). Further, given that clutch 217 is a radial pin slip clutch, driving element 420 transmits torque from shaft 113 (which is matingly received by hexagonal bore 429 of driving element 420) to driven element 321 by way of spring-loaded pins 426 positioned in pockets 430 (blind bores) disposed in a radial outer surface of a body of driving element 420. A respective spring 427 is positioned in the bottom of a respective pocket 430, and a respective pin 426 is position over spring 427 so that spring 427 biases pin 426 radially outwardly and into friction contact with an inner surface of driven element 321. During normal operation of clutch 217, driving element 420 and driven element 321 rotate together, as a unity, together with shaft 113 about an axis of rotation 432. In this way the torque of rotating shaft 113 is transmitted by way of clutch 217 to the gearing in gearcase 215. Such transmission of torque is achieved by a radially outward pressure from spring-loaded pins 426 onto an inner surface of driven element 321 (pins 426 can be disposed in respective longitudinally extending grooves 433 formed on the inner surface of driven element 321), such pressure causing friction between a tapered outer surface of pins 426 and the inner surface of driven element 321. However, when the torque of driving element 420 becomes too great so as to overcome this friction between driving element 420 and driven element 321, pins 426 will slip along the inner surface of driven element 321, out of and back into (and so on) longitudinally extending grooves 433 which are space apart circumferentially on the inner surface of driven element 321, such that torque is not transmitted from driving element 420 to driven element 321, until the torque of driving element 420 no longer overcomes the friction between driving element 321 and driven element 420. Driving element 420, driven element 321, pins 426, and springs 427 can be made of, for example, steel, or any other suitable material known in the art.

Snap ring 449 can be positioned between driving element 420 and input-side seal 428 and can serve to help retain driving element 420 within driven element 321. Snap ring 449 (which can also be referred to as a retainer clip) can be made of steel or a polymer, or any other suitable material. Snap ring 449 can be configured to seat within a groove on the inner surface of driven element 321 and can include tangs or tabs which can be squeezed together with a tool to insert snap ring 449 into the groove (or to remove ring 449 therefrom). Snap ring 449 can include an annular face which prevents driving element 420 from moving axially to the right (in FIGS. 4 and 5). Further, to facilitate the flow of grease 443 through apertures 435 in input-side seal 428 (more below), snap ring 449 can include, for example, a plurality of holes or slots through which grease 443 can readily travel (on the other hand, such holes or slots are not imperative, as grease 443 can travel through apertures 435 in input-side seal 428, around snap ring 449 (such as around an inner radial extent of the annular face of snap ring 449), so as to lubricate parts axially to the left of input-side seal 428 and snap ring 449 in FIGS. 4-5).

Figure 5:
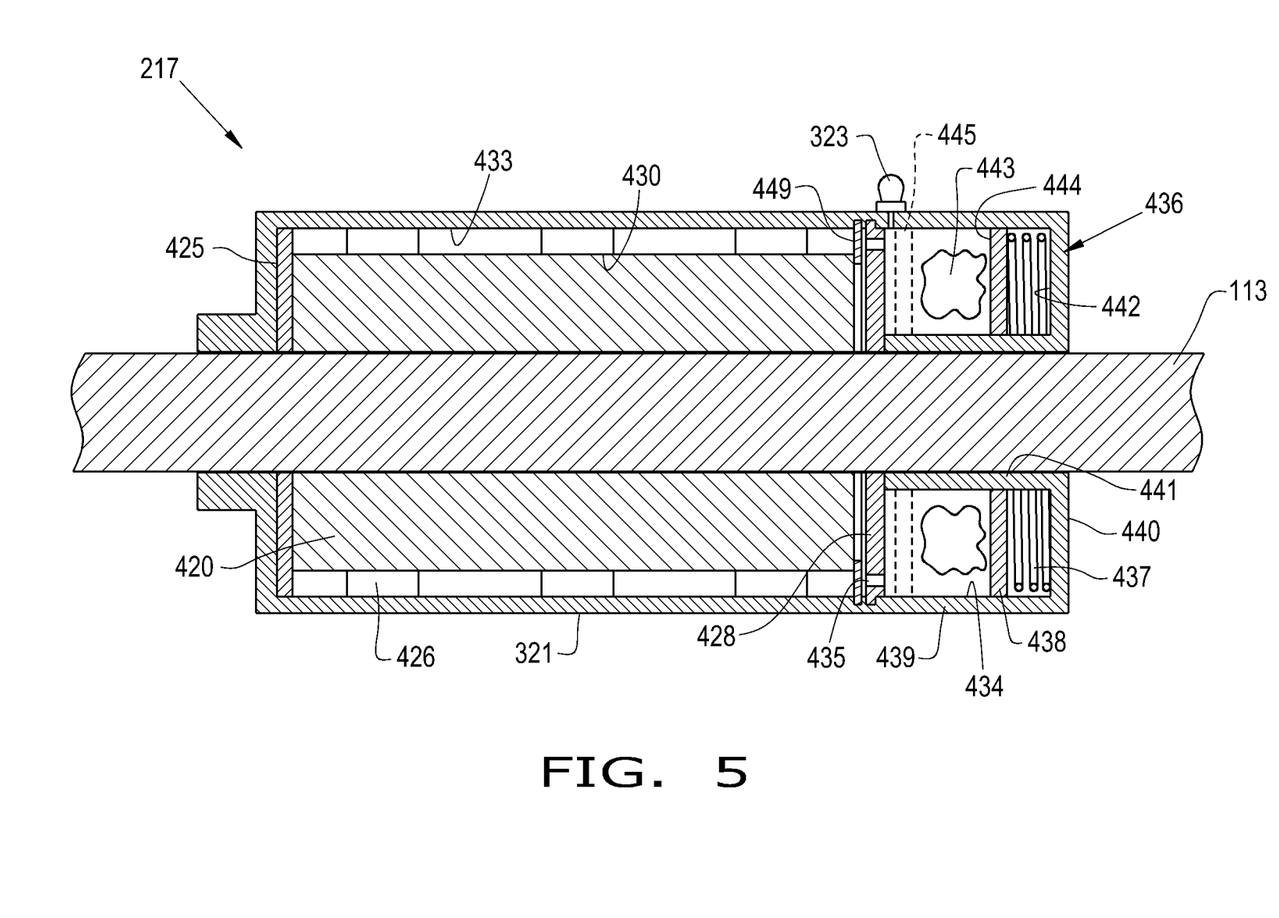
FIG. 5 illustrates a cross-sectional view of the torque limiter assembly of FIG. 3, taken along line 5-5 in FIG. 3.

Input-side seal 428 (which can be referred to as input seal element) is positioned adjacent to driving element 420 and can thus be axially between driving element 420 and automatic greater 324 (herein, input-side seal 428 is deemed to be adjacent to driving element 420 whether or not input-side seal 428 abuts or contacts driving element 420, and whether or not a snap ring or retainer clip intervenes between input-side seal 428 and driving element 420). Input-side seal 428 can be made of any suitable material, such as a polymer. Input-side seal 428 serves to seal grease in a grease chamber 434 (which can be referred to as a chamber or a cavity), or otherwise to generally keep grease from moving out of chamber 434 to the left of input-side seal 428 except through apertures 435. Input-side seal 428 is positioned to the left of (that is, downstream from) grease Zerk 323, so that grease flows from grease Zerk 323 to the right of (that is, upstream from) input-side seal 428 and is thereby stored in grease chamber 434 until needed. Input-side seal 428 includes a plurality of apertures 435 arranged in a circle spaced apart from but near the outer diameter of input-side seal 428, according to at least one embodiment of input-side seal 428. These apertures 435 are configured to allow grease to pass therethrough, moving right to left in FIG. 4 out of grease chamber 434, so that grease lubricates driving element 420 and driven element 321, such as at contact points between driving element 420 and driven element 321. Input-side seal 428 can include an inner diameter which is hexagonally shaped so as to mate with the hexagonal configuration of shaft 113. Input-side seal 428 can include an outer diameter which enables input-side seal 428 to fit snugly within the inner surface of driven element 321. This outer diameter may include a lip which seats within a groove formed on the inner surface of driven element 321 (as shown in FIGS. 4-5, 7, 9), or may, alternatively, omit the lip such that the outer diameter of input-side seal 428 generally abuts the inner surface of driven element 321 without seating in a groove. This lip can help to retain input-side seal 428 in its axial position within driven element 321 and to enhance the sealing qualities of input-side seal, this groove being spaced axially apart from the groove that snap ring 449 seats within (as indicated in FIG. 5) or, alternatively, being the same groove that snap ring 449 uses. Input-side seal 321 can further include a circular protrusion (not shown) (protruding to the right in FIG. 4) spaced radially between the inner and outer diameters (alternatively, at or near the inner diameter) of input-side seal 428 and which is configured to abut a distal end (disposed axially inwardly) of bore 322 of automatic greater 324, so as to further enable sealing of grease within grease chamber 434. Further, according to an alternative embodiment of the present invention, input-side seal 428 can have an alternative shape, such that seal has a substantially reverse-C shape (a bulge or projection axially to the right in FIGS. 4-5), at least in a center portion of seal 428 (in which apertures 435 are formed), as well as a portion radially inward of the central projection that flares axially to the left towards driving element 420.

Automatic greater 324 includes a housing 436, a spring 437, and a piston 438. Housing 436 of automatic greater 324 includes first wall 439, a second wall 440, and a third wall 441. According to the embodiment shown in FIGS. 3-5, these walls 439, 440, 441 are integrally formed relative to one another and formed integral with driven element 321. These walls can be formed, for example, by molding, casting, metal forming, extrusion and welding the walls to one another, or any other suitable method (for example, in order to insert the interior parts of clutch 217 prior to forming second wall 440, second 400, together with third wall 441, can be welded to first wall 439). First wall 439 is formed integral with a wall forming driven element 321 and can be deemed to begin, for example, to the right of grease Zerk 323. Second wall 440 is connected to first and third walls 439, 441, is perpendicular to first and third walls 439, 441, and forms an axial face of clutch 217. Third wall 441 is connected to second wall 440, is disposed radially inwardly of and concentric with first wall 431 and/or driven element 321, and forms bore 322 which is disposed radially outwardly of shaft 113. Third wall 441 is shown in FIG. 5 as being in contact with input-side seal 428, but it can be that third wall 441 is spaced apart from input-side seal 428 (the same can be said for third walls 741, 941 relative to input-side seals 728, 928 in FIGS. 7, 9). Housing 436 can be made of steel, or any suitable material, such as the material of driven member 321.

Referring now to FIG. 5, there is shown a cross-section of clutch 217 taken along line 5-5 in FIG. 3, but further including shaft 113 (shown in cross-section as well). Shown are driving element 420 with spring loaded pins 426, driven element 321 with grooves 433 for mating with input shaft 219 going into gearcase 115, output-side seal 425, snap ring 449, input-side seal 428, housing 436 including first wall 439, second wall 440, and third wall 441, spring 437, and piston 438. Spring 437 (which can be referred to as a resilient member) can be a coil spring. Spring 437 can be a single spring, as shown in the figures, or a plurality of springs. Spring 437 is disposed in an annular space 442 formed by first, second, and third walls 439, 440, 441, and, optionally, driven member 321. At one end of spring 437 (the right in FIGS. 4-5), spring 437 is positioned adjacent second wall 440 so as to press against an inner surface of second wall 449 when spring 437 is compressed (optionally, spring 437 can be attached to the inner surface of second wall 440, such as by welding).

Piston 438 is also housed in annular space 442 formed by first, second, and third walls 439, 440, 441, and, optionally, driven member 321. Piston 438 has an annular configuration (as does housing 436 and spring 437) and is movable, i.e., slidable, within annular space 442. In this way, housing 436 of automatic greater 324 at least partially contains therein piston 438 and spring 438. Piston 438 can be made of any suitable material, such as an ultra-high molecular weight polymer, such as polyethylene. On the right side of piston 438 is spring 437, which biases piston 438 towards input-side seal 428. Spring 437 can be attached to the right side of piston 438, such as by way of any suitable fastener, or by way of a molding process, or by way of any suitable process. Alternatively, piston 438 and spring 437 may not be attached to one another (though they may contact with one another); thus, piston 438 may stop its movement toward input-side seal 428 by way of: piston 438 not receiving sufficient pressure from spring 437; piston 438 abutting against input-side seal 428 (not shown), so long as grease 443 from grease Zerk 323 flows into chamber 434; or, piston 438 abutting an annular stop (not shown)(a protrusion) formed on the inside surface of driven element 321 or first wall 439 or third wall 441. As indicated, on the left side of piston 438 is input-side seal 428, and grease Zerk 323 can be positioned between input-side seal 428 and piston 438, though input-side seal 428, the opening of grease Zerk 323 into chamber 434, and/or piston 438 can be configured or otherwise dimensioned such that piston 438 can, according to an exemplary embodiment of the present invention, abut input-side seal 428 in an extended position 445 of piston 438 (such abutment not shown in the figures, for illustrative purposes, thereby highlighting that grease 443 should flow into grease chamber 434). Piston 438 and input-side seal 428 together at least partially form grease chamber 434 therebetween, chamber 434 being configured to releasably contain grease 443. That is, a right-side surface of input-side seal 428, a left-side surface of piston 438, a top surface of third wall 441, and an inner surface of first wall 439 and/or driven member 321 forms grease chamber 434, the volume of chamber 434 increasing and decreasing depending upon the position of piston 438. Piston 438 can move between a retracted position 444 and extended position 445. Piston 438 occupies retracted position 444 when grease chamber 434 is full of grease 443 and space to the left of input-side seal 428 within clutch 217 is also full of grease 443. As grease 443 works its way out of clutch 217, the biasing force of spring 437 begins pushing piston 438 to the left towards input-side seal 428, thereby pushing grease 443, a small portion at a time, out of chamber 434 and through apertures 435 in input-side seal 428 and into spaces between driving element 420 and driven element 321, thereby keeping these elements 420, 321 lubricated. Thus, piston 438 is configured for forcing grease 443 out of chamber 434 through at least one aperture 435 so as to lubricate driving element 420 and the driven element 321. Piston 438 occupies extended position 445 (as indicated above): when spring 437 has reached its uncompressed state, for example; when piston 438 abuts against input-side seal 428 (extended position 445 of piston 438 can thus be, alternatively to what is shown in FIG. 5 (and correspondingly in FIGS. 7 and 9), located beneath the opening associated with grease Zerk 323, so long as grease 443 flows from grease Zerk 323 into chamber 434); or, when piston 428 abuts an annular stop (not shown)(that can be provided on first and/or third wall 439, 441 near input-side seal 428) to halt movement of piston 438 to the left. Whether piston 438 contacts input-side seal 428 in extended position 445, piston 438 is deemed close enough to input-side seal 428 to be adjacent to input-side seal 428.

In use, an end user of combine 100 can fill grease chamber 434 with grease 443 via grease Zerk 323, until grease chamber 434 cannot accommodate any further grease 443. This condition will occur when not only is grease chamber 434 full of grease 443 but so are other spaces within clutch in the grease flow path extending from input-side seal 428 to output-side seal 425, this flow path generally being between driving element 420 and driven element 321, as well as between pins 426 and driven element 321. Further, once chamber 434 is full of grease, an end user can insert (or otherwise push or pump) additional grease 443 into clutch 217 (more specifically, by way of grease Zerk 323), thereby purging out some grease 443 in the area of output-side seal 425, which can help to remove any possible contamination (in this way, grease 443 can serve as a flushing agent). Upon filling grease chamber 434 in this manner, piston 438 is moved to its retracted position 444. As grease 443 works itself out, such as during use of combine 100 during harvesting season, piston 438 pushes grease 443 out of grease chamber 434 through apertures 435. When piston 438 reaches its extended position 445, it will no longer push grease 443 through apertures 435, and grease chamber 434 is in need of refilling. Further, if clutch 217 slips (that is, driving element 420 continues rotating with shaft 113 while driven element 321 is halted or is otherwise prevented from rotating together with driving element 420), then housing 436, spring 437, and piston 438 stay with driven element 321 while driving element 420 and input-side seal 428 continue to rotate with shaft 113. Further, the area of clutch 217 within driven element 321 and to the left of input-side seal 428 in FIG. 5 (which can be referred to as the clutch area), during use, is always at maximum capacity of containing grease 443, so long as chamber 434 has grease 443, or, alternatively, so long as piston 438 has not yet reached extended position 445.

Figure 6:
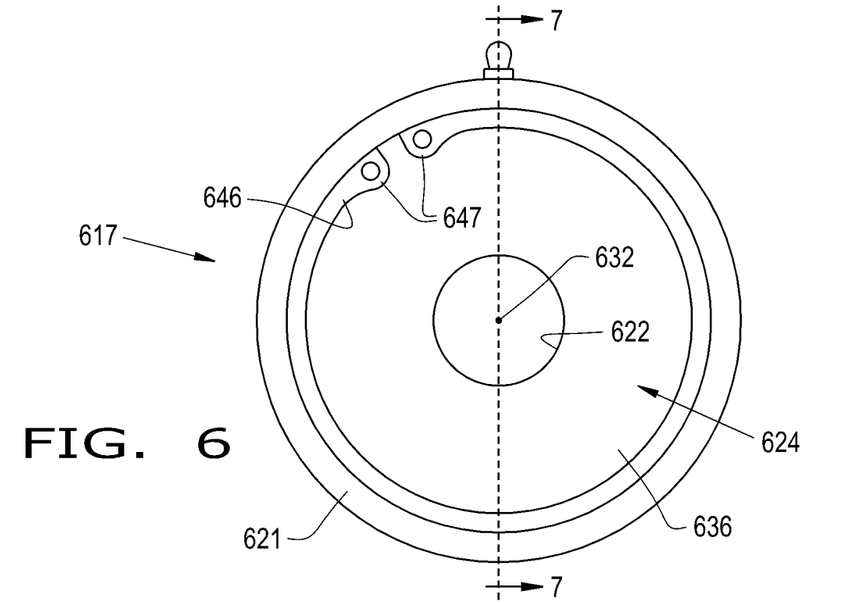
FIG. 6 illustrates a side view of another exemplary embodiment of a torque limiter assembly, in accordance with an exemplary embodiment of the present invention.
Figure 7:
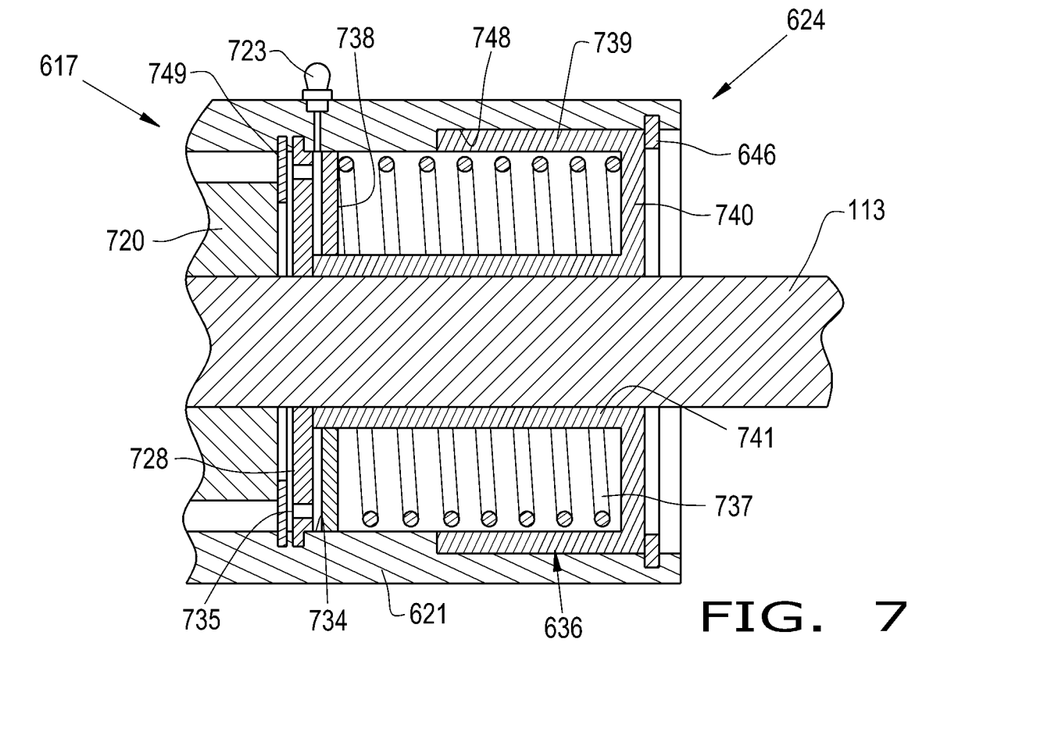
FIG. 7 illustrates a cross-sectional view of the torque limiter assembly of FIG. 6, taken along line 7-7 in FIG. 6.

Referring now to FIGS. 6-7, there is shown another exemplary embodiment of the torque limiter assembly in accordance with the present invention. Like parts of the embodiment shown in FIGS. 3-5 are raised by multiples of 100. The parts of clutch 617 are substantially similar to clutch 217. The primary differences focus on the automatic greaser, more specifically, housing 636 of automatic greater 624. With respect to automatic greater 624, housing 636 is removably coupled with driven element 621. FIG. 6 shows an axial end face of clutch 617, that can rotate as a unit about axis of rotation 632. Driven element 621 is shown above housing 636. Housing 636 is shown, as with clutch 217, having an annular configuration with a bore 622 that accommodates shaft 113 therein. Further, a retainer clip 646 (which can be referred to as a snap ring) is shown, with two tangs 647 for insertion and removal of retainer clip 646, retainer clip 646 serving to hold housing 636 inside driven element 621, more specifically, preventing housing 636 from moving out of the axial end of clutch 617 shown in FIG. 6. Retainer clip 646 is shown with opposing tangs 647 by which an end user can use a tool to squeeze tangs 647 together in order to insert or to remove retainer clip 646 from a groove in driven element 621 in which retainer clip 646 is seated. FIG. 7, a cross-section similar to FIG. 5 taken along line 7-7 in FIG. 6 (with shaft 113 inserted in FIG. 7), shows similar parts to FIG. 5, the description of which will not be repeated in detail. Further, because the structure and function of the parts of clutch 617 to the left of what is broken away are the same or substantially similar to what is shown in FIGS. 3-5, these parts are not shown here. Shown are driving element 720, driven element 621 with grease Zerk 723 for inputting grease into grease chamber 735, snap ring 749, input-side seal 728 with aperture 735, spring 737, piston 738 (in its extended position), and housing 636 disposed within driven element 621 and axially to the right of driving element 720. Housing 636 element includes first wall 739, second wall 740, and third wall 741. First wall 739 seats within a recess 748 formed on the inside surface of driven member 621 on its axial end. Housing 636 is prevented from moving to the left by way of an axially facing wall (vertical wall in FIG. 7) of recess 748. Housing 636 is prevented from moving to the right by way of retainer clip 646, which seats within the groove cut (or otherwise machined) into the inner surface of driven element 621.

Figure 8:
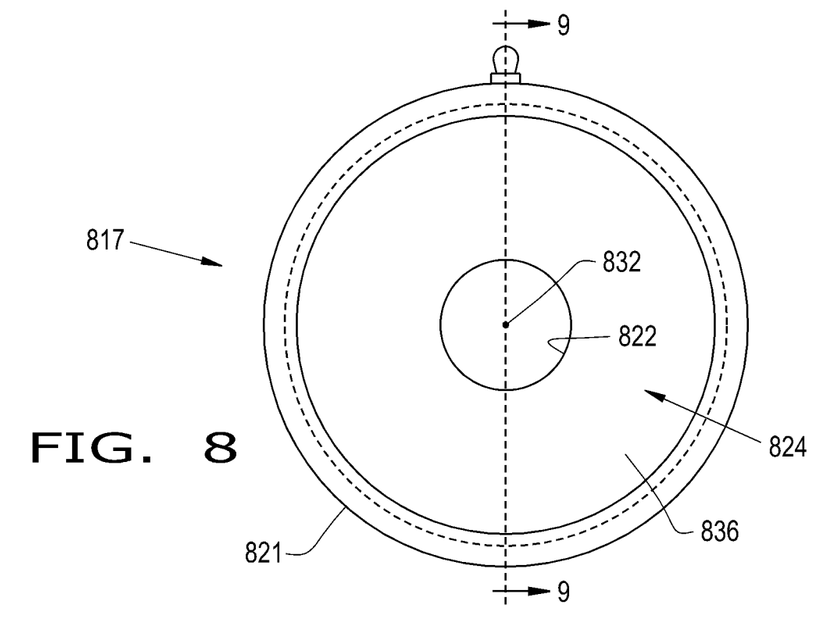
FIG. 8 illustrates a side view of yet another exemplary embodiment of a torque limiter assembly, in accordance with an exemplary embodiment of the present invention.
Figure 9:
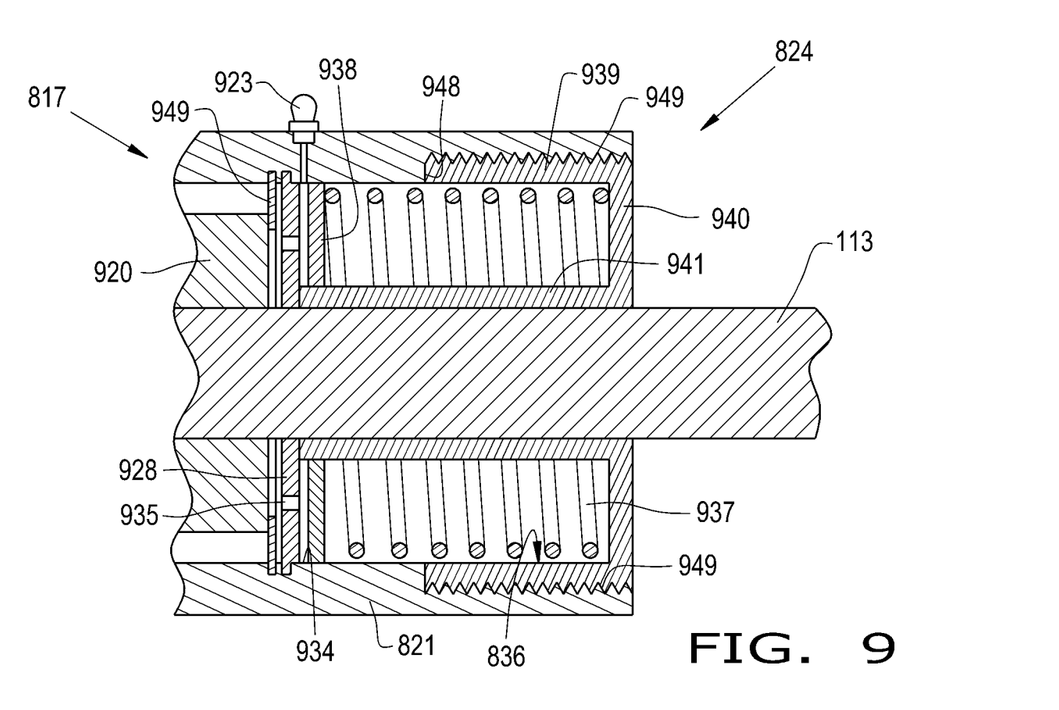
FIG. 9 illustrates a cross-sectional view of the torque limiter assembly of FIG. 8, taken along line 9-9 in FIG. 6.

Referring now to FIGS. 8-9, there is shown yet another exemplary embodiment of the torque limiter assembly in accordance with the present invention. Like parts of the embodiment shown in FIGS. 3-5 are raised by multiples of 100. The parts of clutch 817 are substantially similar to clutch 217. The primary differences focus on automatic greaser, more specifically, housing 836 of automatic greater 824. With respect to automatic greater 824, housing 836 is removably coupled with driven element 821. FIG. 8 shows an axial end face of clutch 817, that can rotate as a unit about axis of rotation 832. Driven element 821 is shown above housing 836. Housing 836 is shown, as with clutch 217, having an annular configuration with a bore 822 that accommodates shaft 113 therein. Rather than a retainer clip to hold in housing 836, clutch 817 employs a threaded configuration. FIG. 8, a cross-section similar to FIG. 5 taken along line 9-9 in FIG. 8 (with shaft 113 inserted in FIG. 9), shows similar parts to FIG. 5, the description of which will not be repeated in detail. Further, because the structure and function of the parts of clutch 817 to the left of what is broken away are the same or substantially similar to what is shown in FIGS. 3-5, these parts are not shown here. Shown are driving element 920, driven element 821 with grease Zerk 923 for inputting grease into grease chamber 934, snap ring 949, input-side seal 928 with aperture 935 (apertures 935, according to another embodiment of the input-side seal, are positioned radially inwardly relative to prior figures, in order to facilitate a flow path of grease 443 around snap ring 949), spring 937, piston 938 (in its extended position), and housing 836 disposed within driven element 821 and axially to the right of driving element 920. Housing 836 includes first wall 939, second wall 940, and third wall 941. First wall 939 includes a threaded portion which threads to a threaded portion of the inside surface of driven element 821 on the axial end of driven element 821, threads of first wall 939 and driven element 821 being shown mated together as threads 949 in FIG. 9. The threaded portion of the inside surface of driven element 821 is situated in a recess 948 that receives first wall 939. Housing 836 thereby becomes fastened to driven element 821.

Figure 10:
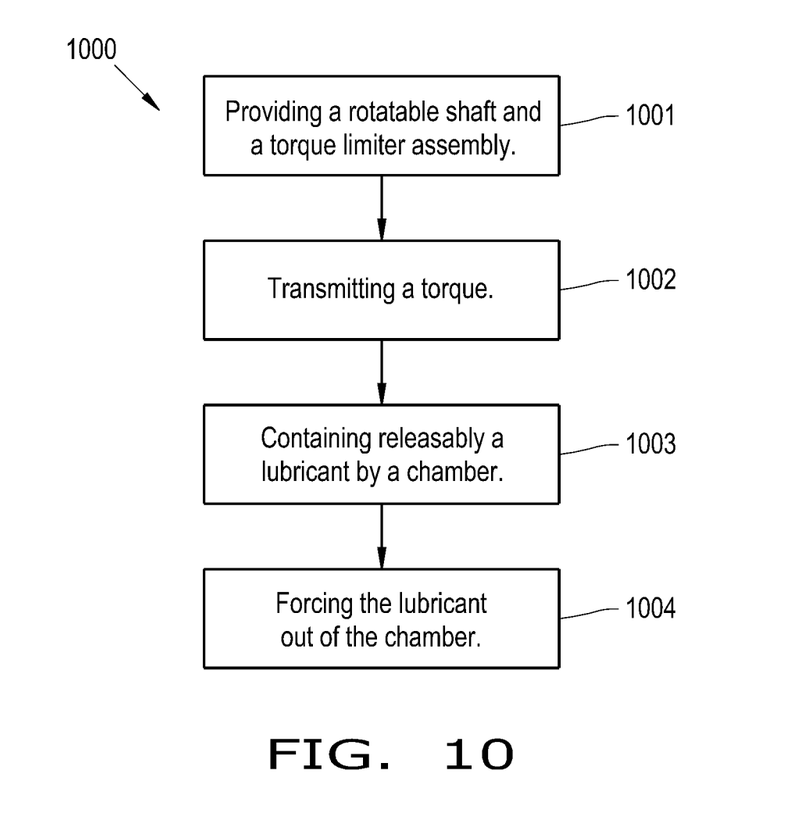
FIG. 10 illustrates a flow diagram showing a method of using the torque limiter assembly, in accordance with an exemplary embodiment of the present invention.

Referring now to FIG. 10, there is shown a flow diagram of a method 1000 of using a torque limiter assembly 217, 617, 817 of a header assembly 110 of an agricultural harvester 100, the method including the steps of: providing 1001 a rotatable shaft 113 and a torque limiter assembly 217, 617, 817 coupled with the rotatable shaft 113, the torque limiter assembly 217, 617, 817 including a driving element 420, 720, 920, a driven element 321, 621, 821, an input seal element 428, 728, 928, and an automatic lubrication mechanism 324, 624, 824, the driving element 420, 720, 920 being mounted to (or otherwise coupled with) the rotatable shaft 113, the driven element 321, 621, 821 being coupled with the driving element 420, 720, 920, the automatic lubrication mechanism 324, 624, 824 being coupled with the driven element 321, 621, 821 and including a movable piston 438, 738, 938; transmitting 1002 selectively, by the driving element 420, 720, 920, a torque to the driven element 321, 621, 821; containing 1003 releasably a lubricant 443 by a chamber 434, 734, 934 formed at least partially by movable piston 438, 738, 938 and the input seal element 428, 728, 928 together therebetween; and forcing 1004, by the movable piston 438, 738, 938, the lubricant 443 out of the chamber 434, 734, 934 through at least one aperture 435, 735, 935 of the input seal element 428, 728, 928 so as to lubricate the driving element 420, 720, 920 and the driven element 321, 621, 821. Further, the torque limiter assembly 217, 617, 817 can be a radial pin slip clutch. The automatic lubrication mechanism 324, 624, 824 can include a resilient member 437, 737, 937 configured for biasing the movable piston 438, 738, 938 towards the input seal element 428 728, 928. Further, the automatic lubrication mechanism 324, 624, 824 can include a housing 436, 636, 836 which at least partially contains therein the movable piston 438, 738, 938 and the resilient member 437, 737, 937. Further, the housing 436, 636, 836 is one of formed integral with and removably coupled with the driven element 321, 621, 821.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A torque limiter assembly of an agricultural harvester, the torque limiter assembly comprising:
   a driving element configured for being coupled with a rotatable shaft of the agricultural harvester;
   a driven element coupled with the driving element which is configured for selectively transmitting a torque to the driven element;
   an input seal element including at least one aperture; and
   an automatic lubrication mechanism coupled with the driven element, the automatic lubrication mechanism including a movable piston, the movable piston and the input seal element together at least partially forming a chamber therebetween configured for releasably containing a lubricant, the movable piston configured for forcing the lubricant out of the chamber through the at least one aperture so as to lubricate the driving element and the driven element.

2. The torque limiter assembly of claim 1, wherein the torque limiter assembly is a radial pin slip clutch.

3. The torque limiter assembly of claim 2, wherein the automatic lubrication mechanism includes a resilient member configured for biasing the movable piston towards the input seal element.

4. The torque limiter assembly of claim 3, wherein the automatic lubrication mechanism includes a housing which at least partially contains therein the movable piston and the resilient member.

5. The torque limiter assembly of claim 4, wherein the housing is one of formed integral with and removably coupled with the driven element.

6. A header assembly of an agricultural harvester, the header assembly comprising:
   a rotatable shaft;
   a torque limiter assembly coupled with the rotatable shaft, the torque limiter assembly including:
      a driving element coupled with the rotatable shaft;
      a driven element coupled with the driving element which is configured for selectively transmitting a torque to the driven element;
      an input seal element including at least one aperture; and
      an automatic lubrication mechanism coupled with the driven element, the automatic lubrication mechanism including a movable piston, the movable piston and the input seal element together at least partially forming a chamber therebetween configured for releasably containing a lubricant, the movable piston configured for forcing the lubricant out of the chamber through the at least one aperture so as to lubricate the driving element and the driven element.

7. The header assembly of claim 6, wherein the torque limiter assembly is a radial pin slip clutch.

8. The header assembly of claim 7, wherein the automatic lubrication mechanism includes a resilient member configured for biasing the movable piston towards the input seal element.

9. The header assembly of claim 8, wherein the automatic lubrication mechanism includes a housing which at least partially contains therein the movable piston and the resilient member.

10. The header assembly of claim 9, wherein the housing is one of formed integral with and removably coupled with the driven element.

11. A method of using a torque limiter assembly of an agricultural harvester including a header assembly, the method comprising the steps of:
    providing a rotatable shaft and a torque limiter assembly coupled with the rotatable shaft, the torque limiter assembly including a driving element, a driven element, an input seal element, and an automatic lubrication mechanism, the driving element being coupled with to the rotatable shaft, the driven element being coupled with the driving element, the automatic lubrication mechanism being coupled with the driven element and including a movable piston;
    transmitting selectively, by the driving element, a torque to the driven element;
    containing releasably a lubricant by a chamber formed at least partially by the movable piston and the input seal element together therebetween; and
    forcing, by the movable piston, the lubricant out of the chamber through at least one aperture of the input seal element so as to lubricate the driving element and the driven element.

12. The method of claim 11, wherein the torque limiter assembly is a radial pin slip clutch.

13. The method of claim 12, wherein the automatic lubrication mechanism includes a resilient member configured for biasing the movable piston towards the input seal element.

14. The method of claim 13, wherein the automatic lubrication mechanism includes a housing which at least partially contains therein the movable piston and the resilient member.

15. The method of claim 14, wherein the housing is one of formed integral with and removably coupled with the driven element.

\* \* \* \* \*